United States Patent
Todd

(10) Patent No.: US 8,167,042 B2
(45) Date of Patent: May 1, 2012

(54) METHOD OF FORMING SELF-DIVERTING HIGH-RATE WATER PACKS

(75) Inventor: Bradley L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 413 days.

(21) Appl. No.: 12/620,842

(22) Filed: Nov. 18, 2009

(65) Prior Publication Data
US 2011/0114312 A1 May 19, 2011

(51) Int. Cl.
*E21B 43/04* (2006.01)
*E21B 43/25* (2006.01)
*E21B 43/267* (2006.01)

(52) U.S. Cl. ............... 166/276; 166/278; 166/280.1; 166/281; 166/283; 166/308.3; 507/924; 507/925

(58) Field of Classification Search .................. None
See application file for complete search history.

(56) References Cited

U.S. PATENT DOCUMENTS

| | | | | |
|---|---|---|---|---|
| 4,670,501 A | 6/1987 | Dymond | | 524/458 |
| 5,249,627 A | 10/1993 | Harms | | 166/308.2 |
| 5,833,000 A | 11/1998 | Weaver | | 166/276 |
| 5,853,048 A | 12/1998 | Weaver | | 166/279 |
| 6,439,309 B1 | 8/2002 | Matherly | | 166/276 |
| 6,488,091 B1 | 12/2002 | Weaver | | 166/300 |
| 6,745,159 B1 | 6/2004 | Todd | | 703/10 |
| 7,036,588 B2 | 5/2006 | Munoz | | 166/279 |
| 7,063,151 B2 * | 6/2006 | Nguyen et al. | | 166/280.2 |
| 7,159,658 B2 | 1/2007 | Frost | | 166/300 |
| 7,211,548 B2 | 5/2007 | Munoz | | 507/212 |
| 7,261,156 B2 * | 8/2007 | Nguyen et al. | | 166/276 |
| 7,264,051 B2 * | 9/2007 | Nguyen et al. | | 166/276 |
| 7,318,473 B2 * | 1/2008 | East et al. | | 166/278 |
| 7,462,581 B2 | 12/2008 | Munoz | | 507/269 |
| 7,814,980 B2 * | 10/2010 | Bryant et al. | | 166/300 |
| 2005/0194135 A1 * | 9/2005 | Nguyen et al. | | 166/272.1 |
| 2005/0194136 A1 * | 9/2005 | Nguyen et al. | | 166/276 |
| 2005/0194137 A1 * | 9/2005 | Nguyen et al. | | 166/276 |
| 2005/0274517 A1 | 12/2005 | Blauch | | 166/208.2 |
| 2005/0277554 A1 | 12/2005 | Blauch | | 507/224 |
| 2006/0137875 A1 | 6/2006 | Dusterhoft | | 166/276 |
| 2006/0196661 A1 * | 9/2006 | East et al. | | 166/276 |
| 2009/0255677 A1 * | 10/2009 | Bryant et al. | | 166/300 |
| 2012/0024526 A1 | 2/2012 | Liang et al. | | |

OTHER PUBLICATIONS

"Fracpack Completions in Deepwater/High-Permeability Reservoirs," by Mark Van Domelen, et al., as prepared for presentation at the Offshore West Africa 2000 Conference and Exhibition held in Abidjan, Ivory Coast, Mar. 21-23.

* cited by examiner

*Primary Examiner* — George Suchfield
(74) *Attorney, Agent, or Firm* — Robert A. Kent; McDermott Will & Emery LLP

(57) ABSTRACT

Methods of forming gravel packs while reducing fluid loss to the surrounding subterranean formation. The methods involve suspending gravel that has been coated with a tackifying agent and degradable fines into a low viscosity carrier fluid and then placing that suspension into a subterranean formation so as to form a gravel pack wherein, as the gravel pack is placed, the degradable fines to de-adhere from the gravel and to fill at least a portion of the pore spaces within the gravel pack so as to reducing fluid loss through the gravel pack.

20 Claims, 11 Drawing Sheets

METHOD OF FORMING SELF-DIVERTING HIGH-RATE WATER PACKS

BACKGROUND

The present invention relates to self-diverting high-rate water packs wherein the gravel is coated with degradable fines that do not substantially mobilize until after the gravel has packed or bridged in a perforation tunnel or fracture.

Traditional operations that place gravel or proppant into subterranean formations use viscosified fluids that are either gelled or gelled and crosslinked in order to increase the fluid's ability to carry suspended particulates. However, in recent years, water packs have become an increasingly popular alternative to conventional gelled slurry gravel packing methods. Water packs are particularly useful in situations wherein the gelled or crosslinked polymers could potentially damage formation permeability. Generally, a water-pack system usually uses non-viscosified brine as the carrier fluid for the gravel or proppant. Rather than relying on viscosity as to carry particulates into perforation tunnels, water packs are used in situations (such as a shorter interval situation) where sufficient velocity can be generated to allow water to carry gravel into the perforation tunnels. Treatments use a blender that can continuously mix gravel and the carrier fluid and supply it to the downhole pump.

More recently, high-rate water packs have come into favor, particularly for use in longer perforated intervals and intervals that are deviated. High-rate water packs are placed at a rate/pressure that is at or near the fracture extension pressure of the reservoir. Placing gravel at such a rate allows for a pressure packing of the perforations and, generally, causes some perforation breakdown. In addition, high rate gravel packs allow for the use of water or a lightly gelled liquid to suspend and carry the gravel based on the flow rate rather than relying on high viscosity.

High-rate water packs are often used to fill perforations, to bypass near-wellbore damage, or to slightly extend fractures while simultaneously filling the fractures with gravel. One known problem in these operations is fluid loss into the formation of the low viscosity carrier fluid once the perforation or fracture has been filled. This is due, at least in part, to the fact that gravel offers relatively little resistance to fluid injection, even when completely filling a perforation tunnel or fracture. Because of the low viscosity nature of the water pack fluid, losses can be severe. Rapid leak off at filled perforations can lead to a risk of a node of gravel building up on the perforation entrance. Such nodes could build to the point of causing a bridge in the screen and screen out the treatment, thus ending the job prematurely. Preferably, once the perforation or fracture is filled, the fluid, and its remaining load of particulates, would divert to fill other perforations and fractures. As used herein "fluid loss" refers to the undesirable migration or loss of fluids (such as the fluid portion of a fracturing or gravel packing fluid) into a subterranean formation.

SUMMARY

The present invention relates to self-diverting high-rate water packs wherein the gravel is coated with degradable fines that do not substantially mobilize until after the gravel has packed or bridged in a perforation tunnel or fracture.

Some embodiments of the present invention provide methods of placing a self-diverting high-rate water pack comprising: providing a low-viscosity carrier fluid, gravel, a tackifying agent, and degradable fines wherein the gravel is at least partially coated with a tackifying agent and wherein degradable fines are adhered to the surface of the gravel having tackifying agent thereon; suspending the gravel into the low-viscosity carrier fluid; placing the suspended gravel in the carrier fluid into a subterranean formation such that the gravel forms a gravel pack having pore spaces within at least a portion of the subterranean formation; and, forming a gravel pack wherein the degradable fines have de-adhered from the surface of the gravel and filled at least a portion of the pore spaces between the gravel particulates.

Other embodiments provide methods of reducing fluid loss during placement of a high-rate water pack comprising: providing a low-viscosity carrier fluid, gravel, a tackifying agent, and degradable fines wherein the gravel is at least partially coated with a tackifying agent and wherein degradable fines are adhered to the surface of the gravel having tackifying agent thereon; suspending the gravel into the low-viscosity carrier fluid; placing the suspended gravel in the carrier fluid into a subterranean formation such that the gravel forms a gravel pack having pore spaces within at least a portion of the subterranean formation; and, forming a gravel pack wherein the degradable fines have de-adhered from the surface of the gravel and filled at least a portion of the pore spaces between the gravel particulates.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF THE PREFERRED EMBODIMENTS

Figure 1:
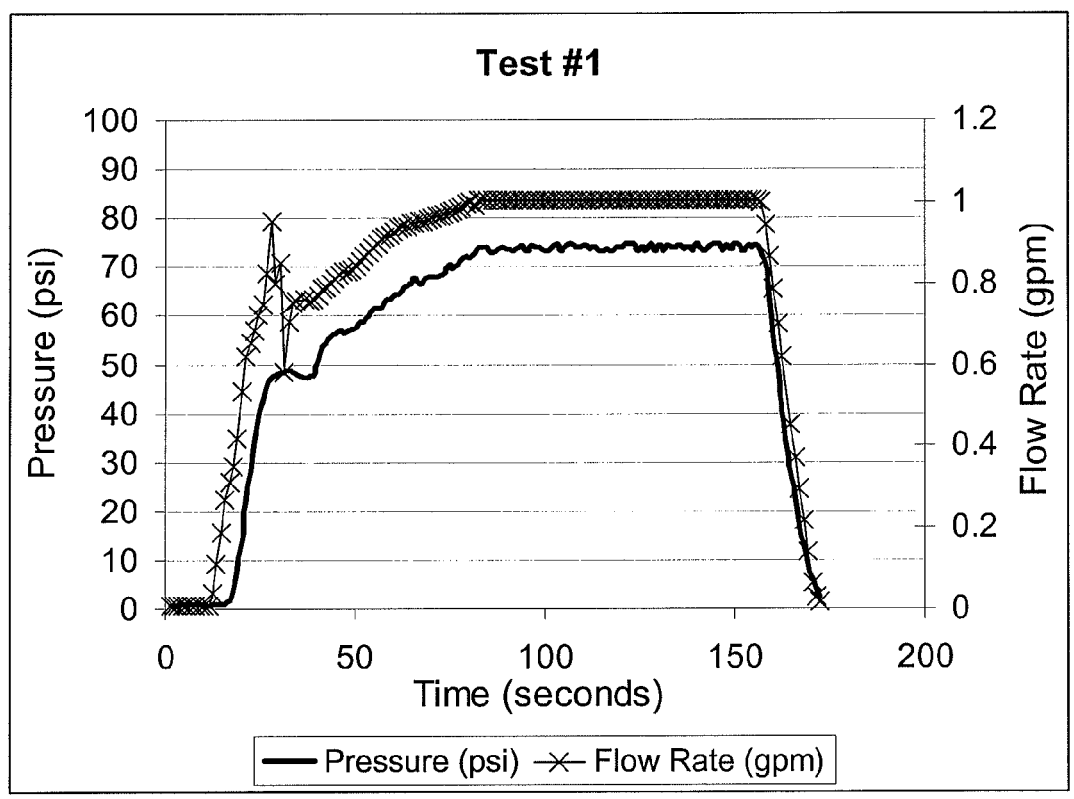
FIG. 1 shows the results of Test #1, sand coated with 0.75% tackifying agent and no degradable material.

The present invention relates to self-diverting high-rate water packs wherein the gravel is coated with degradable fines that do not substantially mobilize until after the gravel has packed or bridged in a perforation tunnel or fracture.

The term "High Rate Water Pack" or "HRWP" as used herein refers to an operation in which gravel is injected into a cased and perforated well at a rate/pressure that is at or near the fracture rate/pressure of the reservoir. Placing gravel at such a rate allows for a pressure packing of the perforations and, generally, causes some perforation breakdown. In addition, high rate gravel packs allow for the use of water or a lightly gelled liquid to suspend and carry the gravel based on the flow rate rather than the through the use of a high viscosity carrier fluid. While the volume of gravel placed may vary, it is generally placed in an amount from about 40 to 250 lbs/ft of perforation. Whereas a traditional gravel pack is pumped at about 2-8 barrels per minute, high-rate water packs are generally pumped from about 5-25 barrels per minute. HRWP's were developed to enhance gravel placement into the perforations and to obtain higher completion efficiencies than traditional water packs, which are pumped at lower rates. Often, placing HRWP's requires a blender that can continuously mix gravel and water and supply it to the down hole pump at high rates.

One known method of determining the reservoir fracture rate/pressure involves performing a "step rate test." A step rate test involves pumping at successively higher rates (1 bbl/min, 2 bbl/min, 3 bbl/min, etc.) while monitoring the pressure on the portion of the subterranean formation being treated. When the data is analyzed (compensating for pipe friction and perforation friction) there will be seen a change in the slope of the plot of pressure versus rate. The rate corresponding to the change in slope is the fracture rate and the corresponding pressure is the fracture pressure. When a high-rate water pack is placed at rates above the fracture rate, they are sometimes referred to as "high-rate water fracs;" denoting the fact that such operations create or in enhance fractures in the same operation as the placement of a gravel pack. Generally, high-rate water fracs are used to both fill the perforation tunnels and to pack the neighboring created or enhanced fractures.

The methods of the present invention provide self-diverting high-rate water packs which reduce unwanted fluid loss and increase the likelihood of proper placement of particulates. Generally the methods of the present invention use a low-viscosity carrier fluid to carry gravel. The gravel used in the methods of the present invention is coated with a tacky substance and wherein the tacky substance is used to adhere degradable fines to the gravel. In the methods of the present invention, the "tackiness" of the tacky substance is tailored such that the degradable fines stay substantially adhered to the gravel until they are placed into a desired location within a subterranean formation. As used herein, the term "tacky," in all of its forms, generally refers to a substance having a nature such that it is (or may be activated to become) somewhat sticky to the touch. The term "low-viscosity carrier fluid," as used herein, refers to a fluid having a viscosity of less than about 20 cp, preferably less than about 10 cp. By way of example, a solution of 10 pounds of guar in 1000 gallons of water solution is a typical low-viscosity carrier fluid. As used herein, the term "degradable fines" refers to solid, particulate material that is smaller in size than the gravel it is adhered to and that is capable of substantially degrading over time in the subterranean environment into which they are placed.

When a high-rate water pack is placed, the gravel is subjected to a known amount of shear during the process of blending the gravel into the low-viscosity carrier fluid and during the process of placing the low-viscosity carrier fluid and gravel into a wellbore and down to a desired portion of a subterranean formation. While centrifugal pumps may be used to mix gravel into a low-viscosity carrier fluid for high-rate water pack operations, the methods of the present invention preferably employ pumps that introduce less shearing effect, such as positive displacement pumps. However, nearly any pump and any blending operation can be employed due to the fact that the degradable particles tend to adhere back to the surface of the gravel during the journey through the wellbore to the area to be treated due to the action of the tacky substance. Once the gravel reaches a location through which it is too large to pass (such as the end of a perforation or fracture or a choke point within a fracture), the gravel stops moving and begins to fill from the outermost point from the wellbore back toward the wellbore. One skilled in the art will recognize that the gravel need not reach the outermost point of a fracture or perforation and that the conditions discussed below may also occur if the gravel bridges across such a space before reaching the outermost point.

Once gravel stoppage and filling begins to occur, the stopped gravel is subjected to significantly higher fluid velocities that it was when it was traveling as part of the fluid. At this point, fluid rushing past the gravel is being lost into the formation, a generally undesirable occurrence. However, according to the methods of the present invention, at this time the degradable fines are subjected to such high velocities (such as in packed perforation tunnels) that the tacky substance is no longer sufficient to adhere the fines to the gravel surface and the fines this begin to break free from the surface of the gravel. The degradable fines, which are preferably sized to effectively block up the interstitial spaces between neighboring pieces of gravel within the gravel pack, are then carried with the carrier fluid until they become lodged between neighboring pieces of gravel or between the gravel and the subterranean formation. Thus, rather than allowing continued fluid loss, the portion of the subterranean formation, which is now packed with gravel, fills with gravel and degradable fines so as to reduce or stop fluid loss. The remaining carrier fluid and gravel is thus diverted to other areas of the subterranean formation where flow continues—such as other perforations or fractures not yet filled with gravel. Over time, the degradable fluid loss material degrades in the subterranean formation, thus restoring permeability and leaving behind a gravel-packed area.

Considering the theoretical velocity change once gravel stoppage occurs, if about 200 pounds of gravel are being placed outside of the casing per foot of interval treated, Table 1 shows the calculated velocity contrast at the formation face outside of the casing compared to the velocity in the perforation tunnels. The data in Table 1 are based on the assumption that the volume of the flow area is cylindrical (a conservative assessment since the volume is probably not a cylinder and more in the form of parted plains). Thus, as seen in Table 1, based on the assumptions above, the ratio of the specific velocity in the perforation tunnel compared to the specific velocity at the wall of the cylinder would be about 84 to 1. Also, as seen in Table 1, increasing the formation area greatly increases the disparity between the specific velocity at the wall of the cylinder to the velocity in the perforation tunnels.

TABLE 1

Determination of Ratios of Flow Areas

| | |
|---|---|
| Formation initial internal diameter | 8.5 inches |
| Proppant behind the casing | 200 pounds/foot |
| Volume of proppant behind the casing | 2 cubic feet |
| Perforation internal diameter | 1 inches |
| Number of perforations per square foot | 12 |
| Perforation area | .06545 square feet |
| Cylindrical Shape | |

TABLE 1-continued

Determination of Ratios of Flow Areas

| | |
|---|---|
| New formation internal diameter | 1.745914 feet |
| Formation flow area | 5.48495 square feet |
| Ratio of formation area to perforation area | 83.80387 |
| 6" wide fracture | |
| Length from tip to tip | 4 feet |
| Formation flow area | 8.5 square feet |
| Ratio of formation area to perforation area | 129.8704 |
| 2" wide fracture | |
| Length from tip to tip | 12 feet |
| Formation flow area | 24.16667 square feet |
| Ratio of formation area to perforation area | 369.2395 |

Figure 11:
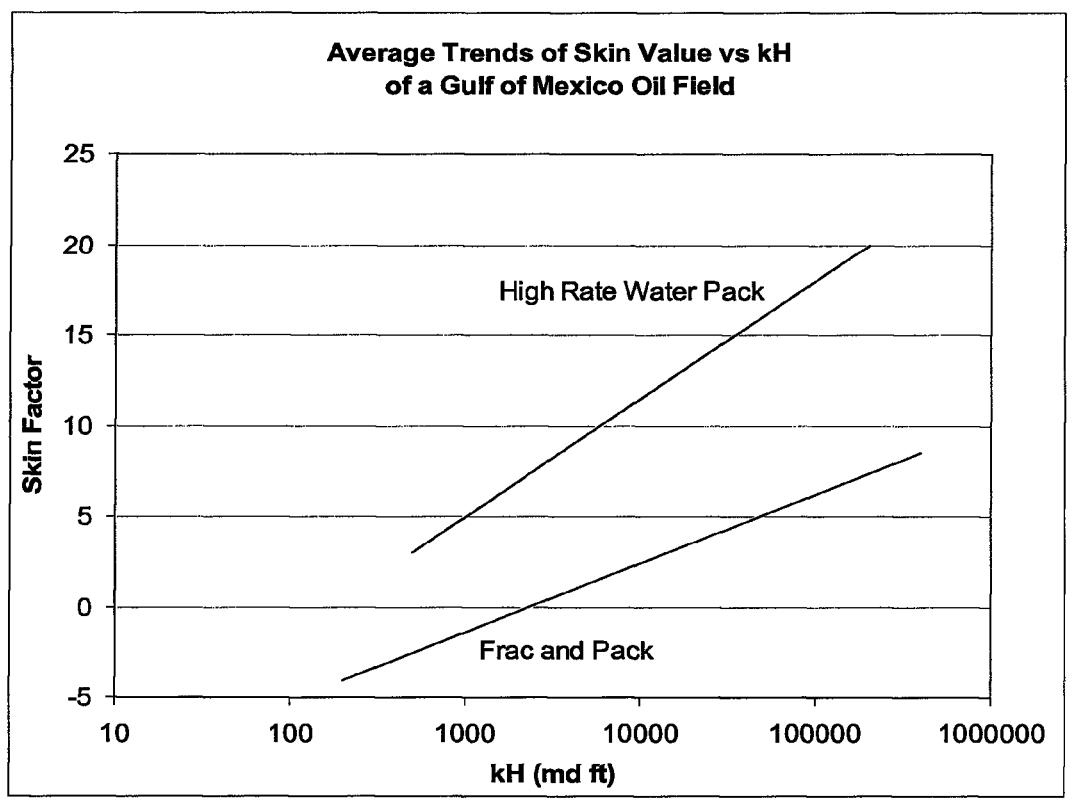
FIG. 11 illustrates a summary of case histories comparing skin values for fracpac treatments versus high-rate water pack treatments.

The methods of the present invention may be particularly well-suited for use in completion operations in deviated wells over 100 feet in length; particularly for those longer wells that are cased-and-perforated in relatively soft sandstone formations. Long, highly deviated wells are generally poor candidates for fracpac treatments (those treatments that combine a fracturing operation with a gravel packing operation) due, at least in part to wellbore/fracture alignment issues. Moreover, such long, deviated wells are generally not long enough to be tolerant to near wellbore damage; thus, high-rate water packs have been a completion technique used in these type wells in an attempt to get at least partial breakdown the perforation tunnels along the interval without growing a single fracture that would take most of the treatment and be poorly connected to the wellbore. However, while high-rate water packs have met with some success, given the case histories, there is much room for further improvement. A summary of case histories comparing skin values for fracpac treatments versus high-rate water pack treatments is shown in FIG. 11. The term "skin value" refers to a dimensionless factor calculated to determine the production efficiency of a well by comparing actual conditions with theoretical or ideal conditions. A positive skin value indicates some damage or influences that are impairing well productivity. A negative skin value indicates enhanced productivity, such as the enhancement resulting from stimulation. The methods of the present invention are designed to increase the percentage of the zone being treated by self-diverting the gravel and carrier fluid once a portion (such as a perforation tunnel) has been treated and packed. As used herein, the term "deviated well bore" refers to a well bore that is at least about 30 to 60 degrees off-vertical (wherein 90-degrees off-vertical corresponds to fully a horizontal well bore). As used herein, the term "highly deviated well bore" refers to a well bore that is at least about 60 to 90 degrees off-vertical (wherein 90-degrees off-vertical corresponds to fully a horizontal well bore).

Where the methods of the present invention are used as a part of a high rate fracpac operation, such an operation may act to either create new fractures within the formation, enhance existing fractions, or both, As used herein, "enhancing" one or more fractures include the extension or enlargement of one or more natural or previously created fractures in the subterranean formation.

Low-viscosity carrier fluids suitable for use in the present invention generally comprise an aqueous fluid that has a viscosity of less than about 20 cp, preferably less than about 10 cp. Suitable fluids include fresh water, salt water, brine, sea water, and any other aqueous liquid that does not adversely react with the other components in the treatment or with the subterranean formation. The fluid may further comprise gelling agents, as long as the overall viscosity of the fluid stays within the acceptable range noted above. Any viscosifying agent known in the art may be employed, including hydratable polymers that contain one or more functional groups such as hydroxyl, carboxyl, sulfate, sulfonate, amino, or amide groups. Suitable gelling typically comprise polymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference.

In embodiments wherein the low-viscosity carrier fluid includes the use of gelling agents, they may also include internal delayed gel breakers such as enzyme, oxidizing, acid buffer, or temperature-activated gel breakers. The gel breakers cause the viscous carrier fluids to revert to thin fluids that can be produced back to the surface after they have been used. When used, a gel breaker is typically present in the carrier fluid in an amount in the range of from about 0.5% to about 10% by weight of the gelling agent. The low-viscosity carrier fluids may also include one or more of a variety of well-known additives, such as gel stabilizers, fluid loss control additives, clay stabilizers, bactericides, and the like.

Gravel suitable for use in the present invention may be comprised of any material suitable for use in subterranean operations. Suitable particulate materials include, but are not limited to, sand; bauxite; ceramic materials; glass materials; polymer materials; polytetrafluoroethylene materials (commonly sold under the brand name Teflon®); nut shell pieces; seed shell pieces; cured resinous particulates comprising nut shell pieces; cured resinous particulates comprising seed shell pieces; fruit pit pieces; cured resinous particulates comprising fruit pit pieces; wood; composite particulates and combinations thereof. Composite particulates may also be suitable, suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Typically, the particulates have a size in the range of from about 2 to about 400 mesh, U.S. Sieve Series. In particular embodiments, preferred particulates size distribution ranges are one or more of 6/12 mesh, 8/16, 12/20, 16/30, 20/40, 30/50, 40/60, 40/70, or 50/70 mesh. It should be understood that the term "gravel," as used in this disclosure, includes all known shapes of materials including substantially spherical materials, fibrous materials, polygonal materials (such as cubic materials) and mixtures thereof.

Degradable fines suitable for use in the present invention include, but are not limited to, degradable polymers, dehydrated compounds, and mixtures thereof. Such degradable materials are capable of undergoing an irreversible degradation downhole. The term "irreversible" as used herein means that the degradable material, once degraded downhole, should not recrystallize or reconsolidate, e.g., the degradable material should degrade in situ but should not recrystallize or reconsolidate in situ. Suitable examples of degradable polymers that may be used in accordance with the present invention include, but are not limited to, homopolymers, random, block, graft, and star- and hyper-branched polymers. Specific examples of suitable polymers include polysaccharides such as dextran or cellulose; chitin; chitosan; proteins; aliphatic polyesters; poly(lactide); poly(glycolide); poly(ϵ-caprolactone); poly(hydroxybutyrate); poly(anhydrides); aliphatic polycarbonates; poly(ortho esters); poly(amino acids); poly (ethylene oxide); and polyphosphazenes. Polyanhydrides are another type of particularly suitable degradable polymer useful in the present invention. Examples of suitable polyanhydrides include poly(adipic anhydride), poly(suberic anhydride), poly(sebacic anhydride), and poly(dodecanedioic anhydride). Other suitable examples include but are not limited to poly(maleic anhydride) and poly(benzoic anhydride). One skilled in the art will recognize that plasticizers may be included in forming suitable polymeric degradable materials of the present invention. The plasticizers may be present in an amount sufficient to provide the desired characteristics, for example, plasticizers may increase the likelihood of an effective mixtures of the melt blend components, may improve processing characteristics during the blending and processing steps, and may control and regulate of the sensitivity and degradation of the polymer by moisture.

Suitable dehydrated compounds that may be used as degradable fine according top the present invention are those materials that will degrade over time when rehydrated. For example, a particulate solid dehydrated salt or a particulate solid anhydrous borate material that degrades over time may be suitable. Specific examples of particulate solid anhydrous borate materials that may be used include but are not limited to anhydrous sodium tetraborate (also known as anhydrous borax), and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are substantially soluble in water as compared to anhydrous borate materials and as a result degrade in the aqueous fluid.

In addition, blends of certain degradable materials and other compounds may also be suitable for use as the degradable fines according to the present invention. One example of a suitable blend of materials is a mixture of poly(lactic acid) and sodium borate where the mixing of an acid and base could result in a neutral solution where this is desirable. Another example would include a blend of poly(lactic acid) and boric oxide. In choosing the appropriate degradable material or materials, one should consider the degradation products that will result. The degradation products should not adversely affect subterranean operations or components. The choice of degradable material also can depend, at least in part, on the conditions of the well, e.g., well bore temperature. For instance, lactides have been found to be suitable for lower temperature wells, including those within the range of 60° F. to 150° F., and polylactide have been found to be suitable for well bore temperatures above this range. Poly(lactic acid) and dehydrated salts may be suitable for higher temperature wells. Also, in some embodiments a preferable result is achieved if the degradable material degrades slowly over time as opposed to instantaneously. In some embodiments, it may be desirable when the degradable material does not substantially degrade until after the degradable material has been substantially placed in a desired location within a subterranean formation. One skilled in the art, with the benefit of this disclosure will be able to select an appropriate material to use for the degradable fines.

In addition to the selection of the material for the degradable fines, those fine must also be correctly sized for the methods of the present invention. Preferably, the degradable fine size is selected such that, when mobilized, the fines are capable of at least partially blocking the pore spaces left between neighboring pieces of gravel. The fines should thus be sized based on the size and sphericity of the selected gravel and the type of packing. By type of packing, for example, sand allowed to naturally settle in the bottom of a vessel might result in relatively loose, random packing whereas particles that are vibrated after forming a pack will result in tighter, more ordered packing. Examples of ordered packing include hexagonal close pack, face centered cubic. In general however, in each type of packing there will result somewhere in the pack a pore throat shaped from three tangent particles. This type pore throat is the smallest possible with rigid particles. Degradable fines used in the present invention are sized so as to be larger than such pore throats so that they are capable of bridging the pore throat and forming a blockage. In more ordered, dense pack, the pore throat will be smaller and the degradable fine will be able to more easily block up the pack; however, even in loosely packed beds blockage will occur over time. In the case of a gravel pack formed in a perforation tunnels, the magnitude of flow forces on the gravel pack will likely result in a relatively ordered, dense pack. By way of example, the median pore throat diameter of 20/40 gravel pack sand is about 100 microns. Also, one of skill in the art will recognize that when sphericity drops, there will be a tendency of protruding parts of the particle to reduce the pore throat size from three tangent particles; thus, calculations based on an assumption of perfect spheres provides the most conservative estimate of particle bridging (requiring larger degradable fines to achieve blockage). In addition to particle size and sphericity, rigidity of the degradable fines themselves may also effect the selection of the degradable fine size. By way of example, flexible degradable fines may require a fine size up to about 150% of the pore throat size.

The degradable fines are adhered onto the surface of the gravel using a tackifying agent. Tackifying agents suitable for use in the present invention include non-aqueous tackifying agents; aqueous tackifying agents; and silyl-modified polyamides. Unlike resins, tackifying agents do not harden to more solid masses. Rather they provide an elasticity to the connection between two solid particles such that they may be adhered to one another and then pulled apart when placed under stress. As noted above, the method of the present invention use tackifying agents to temporarily adhere degradable fines to the surface of gravel such that they are released once placed under greater stress (such as the increase in frictional stress caused when the gravel particles become lodged into a portion of a formation while the low viscosity carrier fluid continues to flow around them).

One type of preferred tackifying agents comprises non-aqueous tackifying agents; polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as non-aqueous tackifying compounds include liquids and solutions of, for example, polyesters, polycarbonates and polycarbamates, natural resins such as shellac and the like. Other suitable non-aqueous tackifying agents are described in U.S. Pat. No. 5,853,048 issued to Weaver, et al. and U.S. Pat. No. 5,833,000 issued to Weaver, et al., the relevant disclosures of which are herein incorporated by reference.

Solvents suitable for use with the non-aqueous tackifying agents of the present invention include any solvent that is compatible with the non-aqueous tackifying agent and achieves the desired viscosity effect. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d' limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether a solvent is needed to achieve a viscosity suitable to the subterranean conditions and, if so, how much.

Aqueous tackifying agents suitable for use in the present invention are not significantly tacky when placed onto a particulate, but are capable of being "activated" (that is destabilized, coalesced and/or reacted) to transform the compound into a sticky, tackifying compound at a desirable time. Such activation may occur before, during, or after the aqueous tackifying agent is placed in the subterranean formation. In some embodiments, a pretreatment may be first contacted with the surface of a particulate to prepare it to be coated with an aqueous tackifying agent. Suitable aqueous tackifying agents are generally charged polymers that comprise compounds that, when in an aqueous solvent or solution, will form a non-hardening coating (by itself or with an activator) and, when placed on a particulate, will increase the continuous critical resuspension velocity of the particulate when contacted by a stream of water. The aqueous tackifying agent may enhance the grain-to-grain contact between the individual particulates within the formation (be they proppant particulates, formation fines, or other particulates), helping bring about the consolidation of the particulates into a cohesive, flexible, and permeable mass.

Suitable aqueous tackifying agents include any polymer that can bind, coagulate, or flocculate a particulate. Also, polymers that function as pressure sensitive adhesives may be suitable. Examples of aqueous tackifying agents suitable for use in the present invention include, but are not limited to: acrylic acid polymers; acrylic acid ester polymers; acrylic acid derivative polymers; acrylic acid homopolymers; acrylic acid ester homopolymers (such as poly(methyl acrylate), poly(butyl acrylate), and poly(2-ethylhexyl acrylate)); acrylic acid ester co-polymers; methacrylic acid derivative polymers; methacrylic acid homopolymers; methacrylic acid ester homopolymers (such as poly(methyl methacrylate), poly(butyl methacrylate), and poly(2-ethylhexyl methacrylate)); acrylamido-methyl-propane sulfonate polymers; acrylamido-methyl-propane sulfonate derivative polymers; acrylamido-methyl-propane sulfonate co-polymers; and acrylic acid/acrylamido-methyl-propane sulfonate co-polymers, derivatives thereof, and combinations thereof. The term "derivative" as used herein refers to any compound that is made from one of the listed compounds, for example, by replacing one atom in the base compound with another atom or group of atoms. Methods of determining suitable aqueous tackifying agents and additional disclosure on aqueous tackifying agents can be found in Published U.S. Patent Application Number 2005-0277554 and Published U.S. Patent Application Number 2005-0274517, the relevant disclosures of which are hereby incorporated by reference.

Some suitable aqueous tackifying agents are described in U.S. Pat. No. 5,249,627 by Harms, et al., the relevant disclosure of which is incorporated by reference. Harms discloses aqueous tackifying agents that comprise at least one member selected from the group consisting of benzyl coco di-(hydroxyethyl) quaternary amine, p-T-amyl-phenol condensed with formaldehyde, and a copolymer comprising from about 80% to about 100% $C_{1-30}$ alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. Suitable hydrophillic monomers may be any monomer that will provide polar oxygen-containing or nitrogen-containing groups. Suitable hydrophillic monomers include dialkyl amino alkyl (meth)acrylates and their quaternary addition and acid salts, acrylamide, N-(dialkyl amino alkyl) acrylamide, methacrylamides and their quaternary addition and acid salts, hydroxy alkyl (meth)acrylates, unsaturated carboxylic acids such as methacrylic acid or preferably acrylic acid, hydroxyethyl acrylate, acrylamide, and the like. These copolymers can be made by any suitable emulsion polymerization technique. Methods of producing these copolymers are disclosed, for example, in U.S. Pat. No. 4,670,501, the relevant disclosure of which is incorporated herein by reference.

Silyl-modified polyamide compounds suitable for use as an tackifying agents in the methods of the present invention may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309 issued to Matherly, et al., the relevant disclosure of which is herein incorporated by reference.

According to the methods of the present invention, gravel is at least partially coated with a tackifying agent and then degradable fines are adheres to the surface of the gravel, held in place due to the action of the tackifying agent. The gravel, having tackifying agent and degradable fines thereon is then suspended in a low-viscosity carrier fluid and placed into a desired location within a subterranean formation. In preferred embodiments, the gravel is suspended in the low-viscosity carrier fluid using a blender that can continuously mix the coated gravel and the aqueous fluid and supply it to the downhole pump at high rates. High-rate water packs placed according to the methods of the present invention are generally pumped at from about 5-25 barrels per minute, preferably from about 10-25 barrels per minute, and more preferably from about 15-20 barrels per minute To facilitate a better understanding of the present invention, the following examples of certain aspects of some embodiments are given. In no way should the following examples be read to limit, or define, the entire scope of the invention.

EXAMPLES

A test cell was designed having a flow path wherein the water first flowed through a pack of stainless steel wool in order to ensure flow diffusion and then the water passed into and through a screen and then into a gravel pack of varying composition (as set forth below). A second screen was placed at the end of the gravel pack to hold the gravel in place. Table 2, below shows the amount of gravel (20/40 sand) used to pack the cell, the amount of tackifying agent coated onto the sand in percent by weight of sand, and the amount of degradable fines attached to the gravel (sand) as a percentage by weight of the gravel. For each test, the gravel used was 20/40 sand, the tackifying agent was Sandwedge (commercially available from Halliburton Energy Services, Duncan Okla.), and the degradable fines were BioVert H150, cryogenically ground polylactic acid having a 150 micron median diameter (commercially available from Halliburton Energy Services, Duncan Okla.). The pressure experiences inside the cell were recorded for each test.

| Test | Pounds of Gravel | Tackifying Agent (as % of sand weight) | Degradable Fines (as % of sand weight) | Pressure Increase (psi/sec) |
| --- | --- | --- | --- | --- |
| 1 | 0.33 | 0.75 | 0 | 0.0 |
| 2 | 0.33 | 0.75 | 1 | 0.02 |
| 3 | 0.34 | 0.67 | 2 | 0.60 |
| 4 | 0.34 | 0.67 | 3 | 0.12 |
| 5 | 0.32 | 0.40 | 3 | 0.12 |
| 6 | 0.32 | 0.27 | 3 | 0.36 |
| 7 | 0.33 | 0.27 | 4 | 0.12 |
| 8 | 0.34 | 0.27 | 3 | 0.09 |
| 9 | 0.34 | 0.20 | 3 | 0.23 |
| 10 | 0.34 | 1.00 | 8.3 | 1.55 |

Test #1. A control was run using a cell packed with 150 g of sand that was coated with 0.75% Sandwedge by weight of the sand. FIG. 1 shows that, as expected, no pressure increase was seen at 1 gpm flow rate.

Each of the following Tests (#2-#10) were all run first at 40 mL/min (approximately 1/100th of 1 gallon/minute) to determine that no change in pressure occurred at that relatively low rate lower rate before the flow rate was increased. For each test (#2-#10) the pressure trace remained flat at the lower rate.

Figure 2:
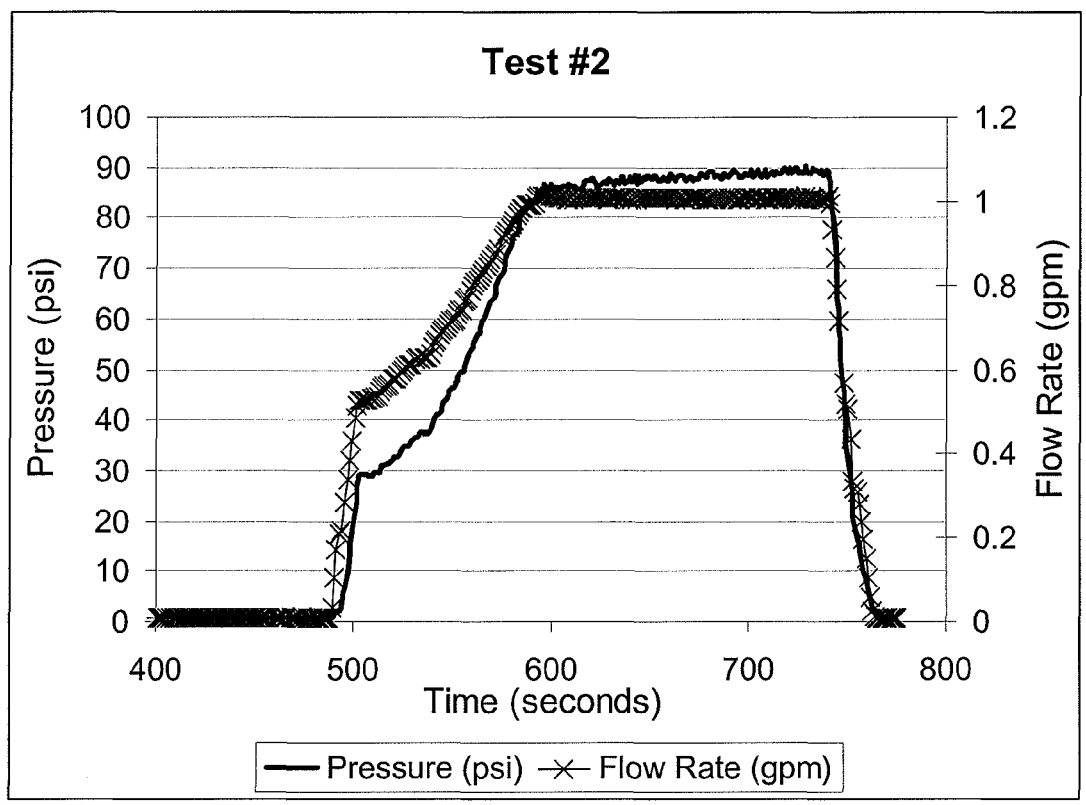
FIG. 2 shows the results of Test #2, sand coated with 0.75% tackifying agent and 1% degradable material.

Test #2. The cell was packed with 150 g of sand that was coated with 0.75% Sandwedge by weight of the sand and with 1% polylactic acid by weight of the sand. At 1 gal/min, no significant pressure increase was seen, as shown at FIG. 2.

Figure 3:
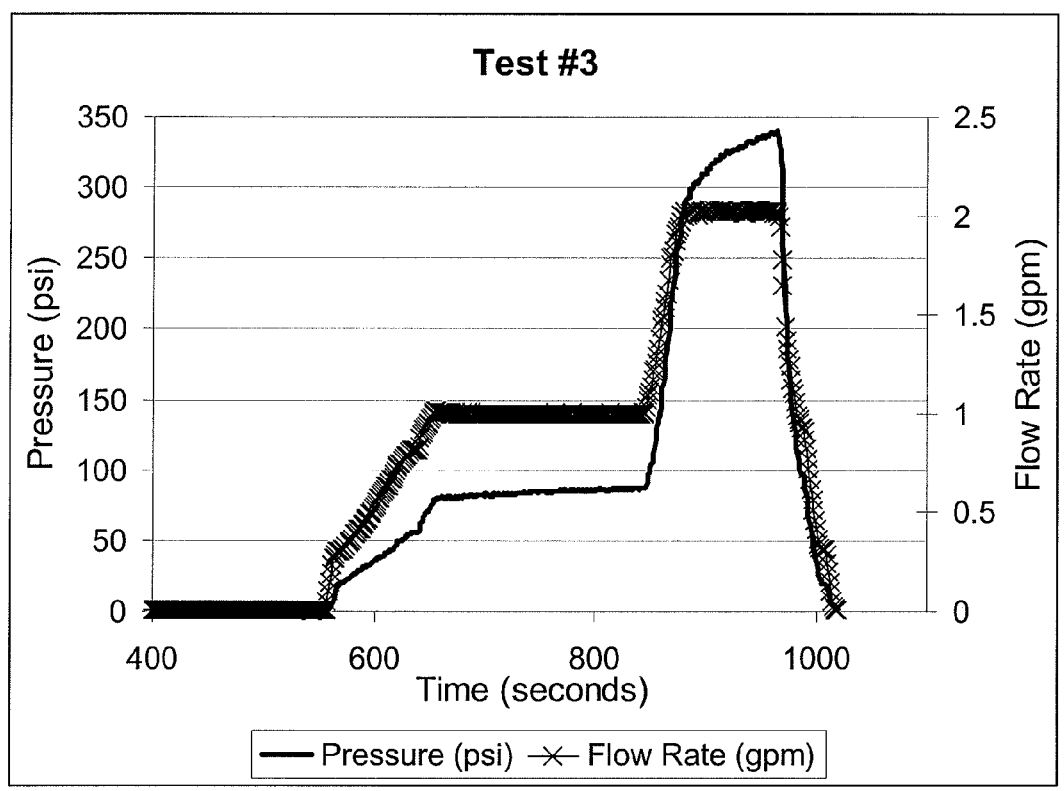
FIG. 3 shows the results of Test #3, sand coated with 0.67% tackifying agent and 2% degradable material.

Test #3. The cell was packed with 150 g of sand that was coated with 0.67% Sandwedge and with 2% polylactic acid. At 1 gal/min, no pressure increase was seen. The rate was then increased to 2 gal/min and a ramp in pressure of about 0.6 psi/sec was seen, as shown in FIG. 3, indicating that the degradable fines were acting to plug the interstitial spaces.

Figure 4:
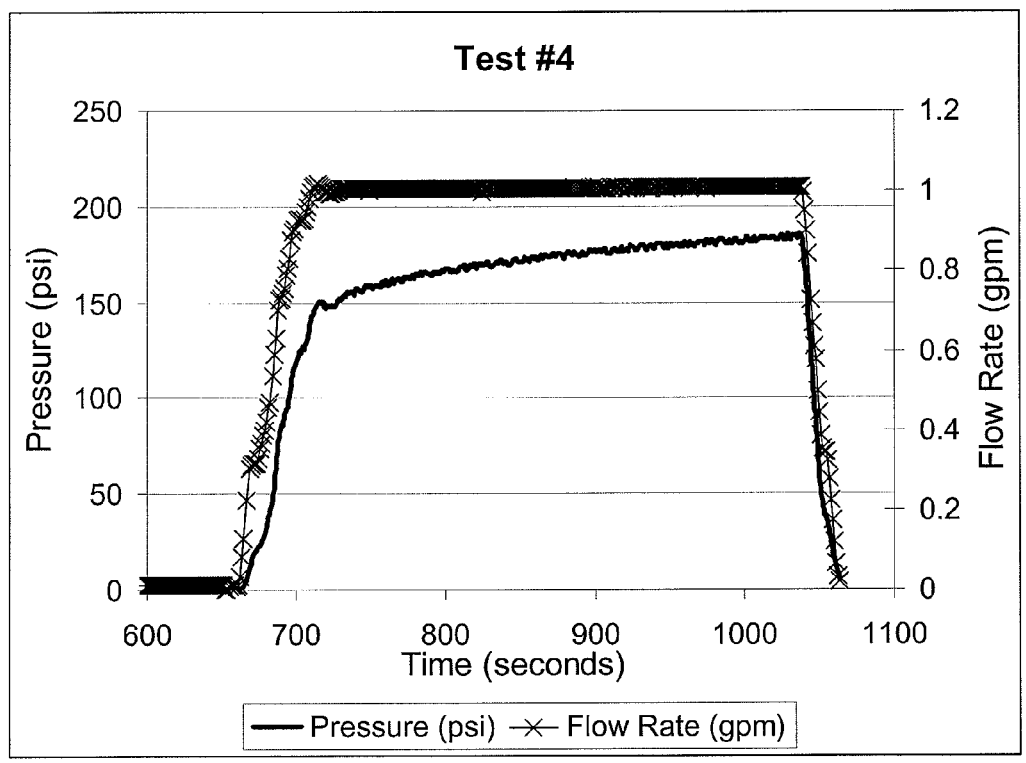
FIG. 4 shows the results of Test #4, sand coated with 0.67% tackifying agent and 3% degradable material.

Test #4: The cell was packed with 150 g of sand that was coated with 0.67% Sandwedge and with 3% polylactic acid. At 1 gal/min, a ramp in pressure of about 0.12 psi/sec was seen, indicating the plugging due to the degradable fines at this combination of rate and tackifying agent, as seen in FIG. 4.

Figure 5:
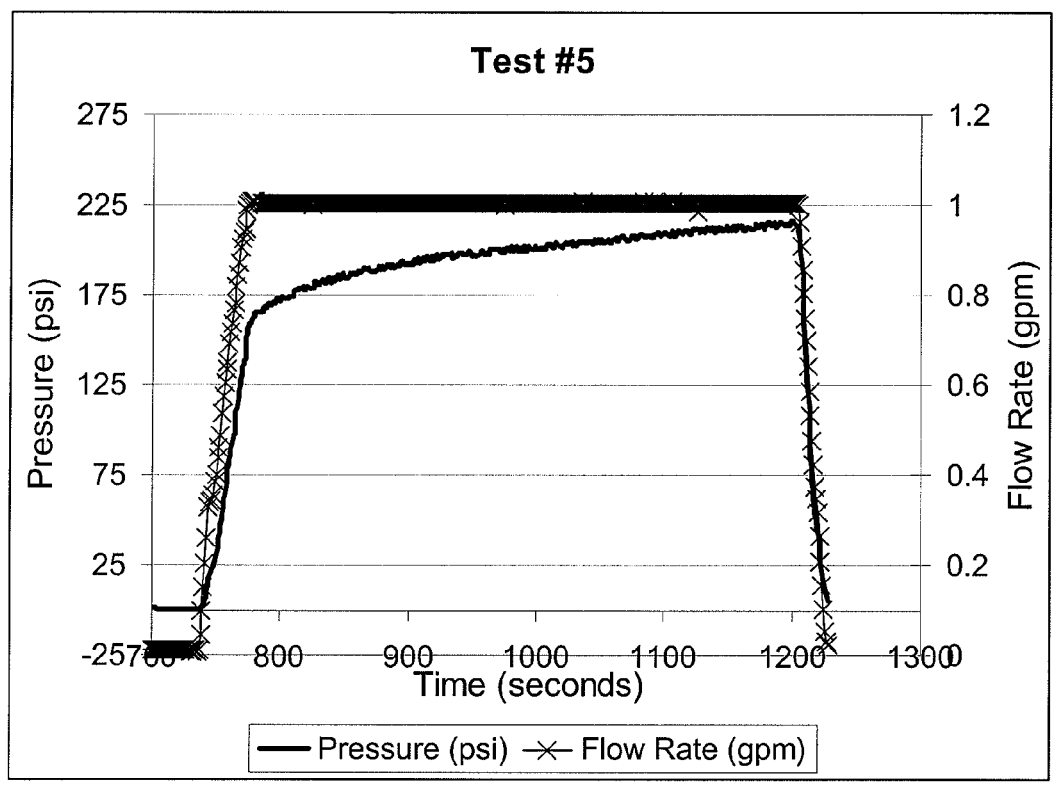
FIG. 5 shows the results of Test #5, sand coated with 0.4% tackifying agent and 3% degradable material.

Test #5: The cell was packed with 150 g of sand that was coated with 0.4% Sandwedge and with 3% polylactic acid. At 1 gal/min, a ramp in pressure of about 0.12 psi/sec was seen, as shown in FIG. 5.

Figure 6:
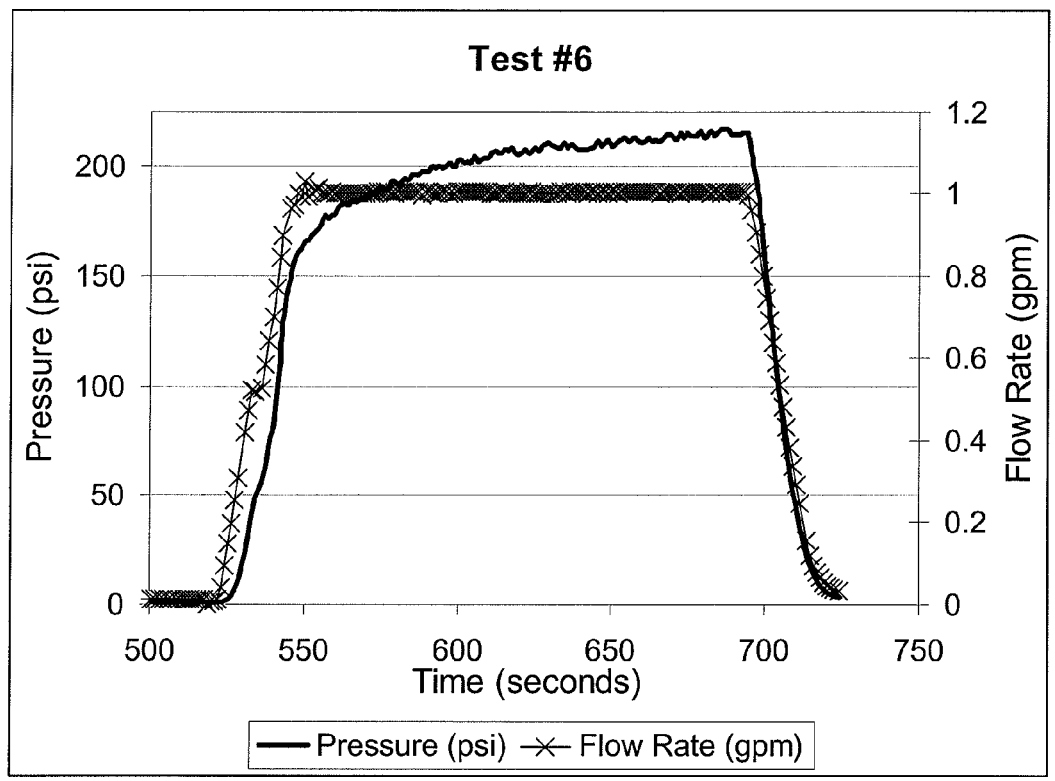
FIG. 6 shows the results of Test #6, sand coated with 0.27% tackifying agent and 3% degradable material.

Test #6: The cell was packed with 150 g of sand that was coated with 0.27% Sandwedge and with 3% polylactic acid. At 1 gal/min, a ramp in pressure of about 0.36 psi/sec, as shown in FIG. 6.

Figure 7:
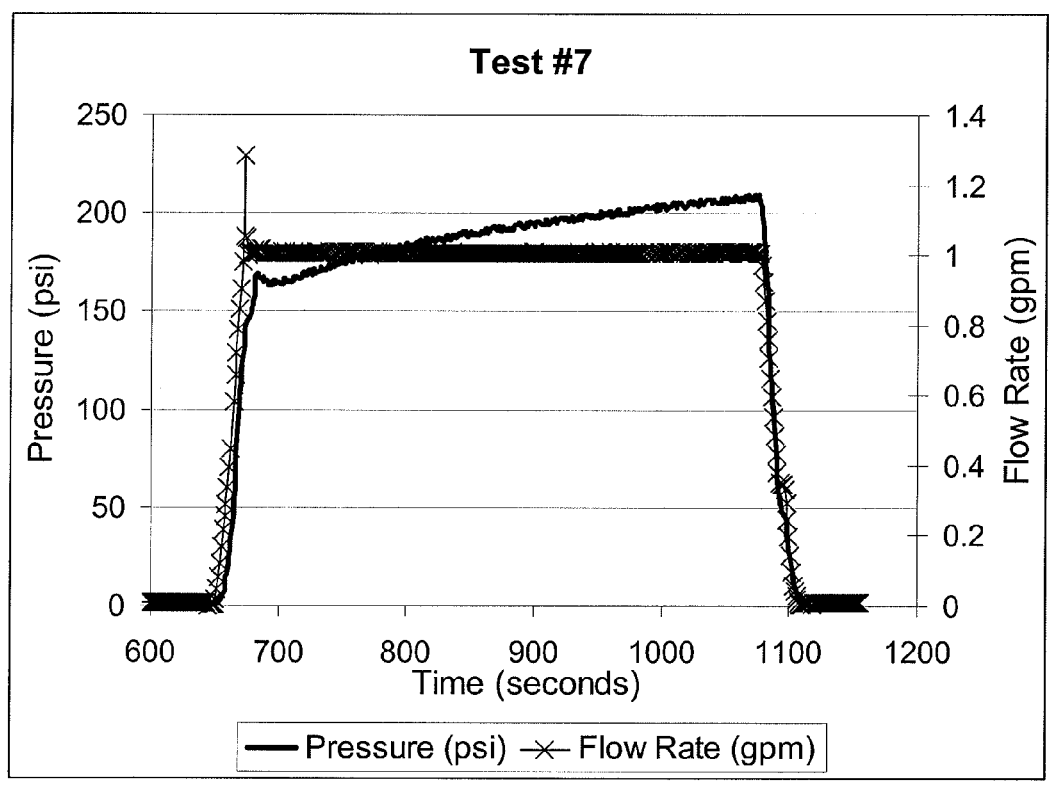
FIG. 7 shows the results of Test #7, sand coated with 0.27% tackifying agent and 4% degradable material.

Test #7: The cell was packed with 150 g of sand that was coated with 0.27% Sandwedge and with 4% polylactic acid. At 1 gal/min, a ramp in pressure of about 0.12 psi/sec was seen, as shown in FIG. 7. From this point forward the cell was modified with a pressure port just above the bottom screen in case of suspected plugging of the bottom screen in the cell which might cloud the data.

Figure 8:
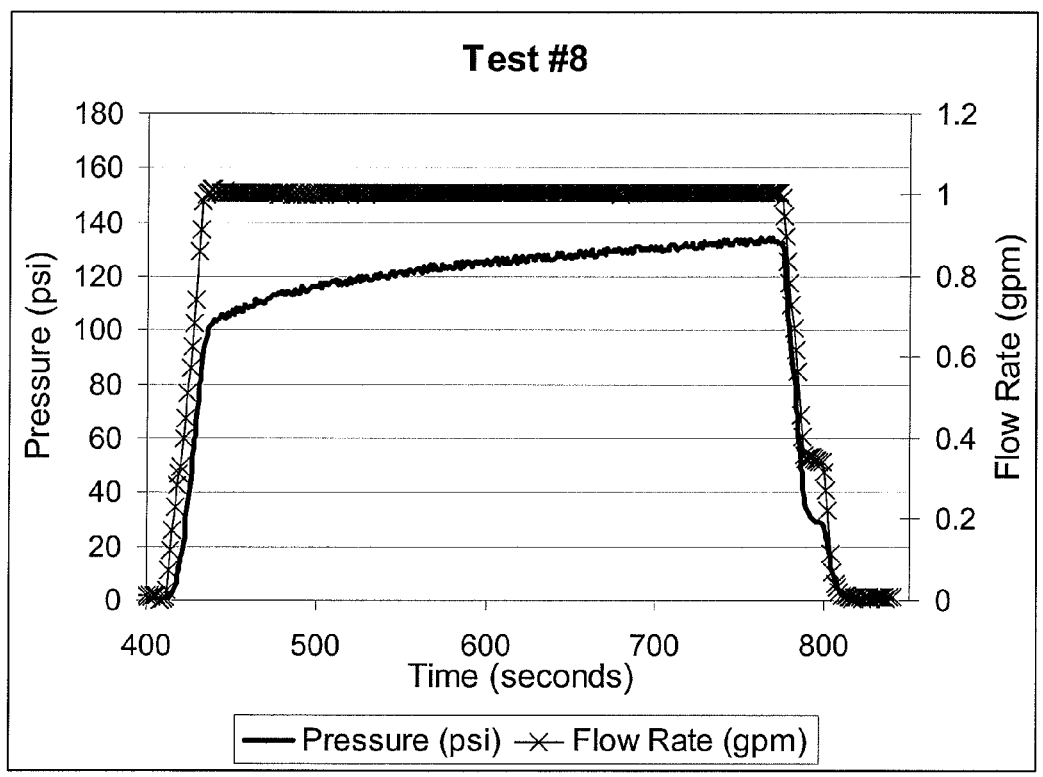
FIG. 8 shows the results of Test #8, sand coated with 0.27% tackifying agent and 3% degradable material.

Test #8: Test #8 was a repeat of Test #6 following the modification of the test cell. The cell was packed with 150 g of sand that was coated with 0.27% Sandwedge and with 3% polylactic acid. At 1 gal/min, a ramp in pressure of about 0.09 psi/sec was seen, as shown in FIG. 8.

Figure 9:
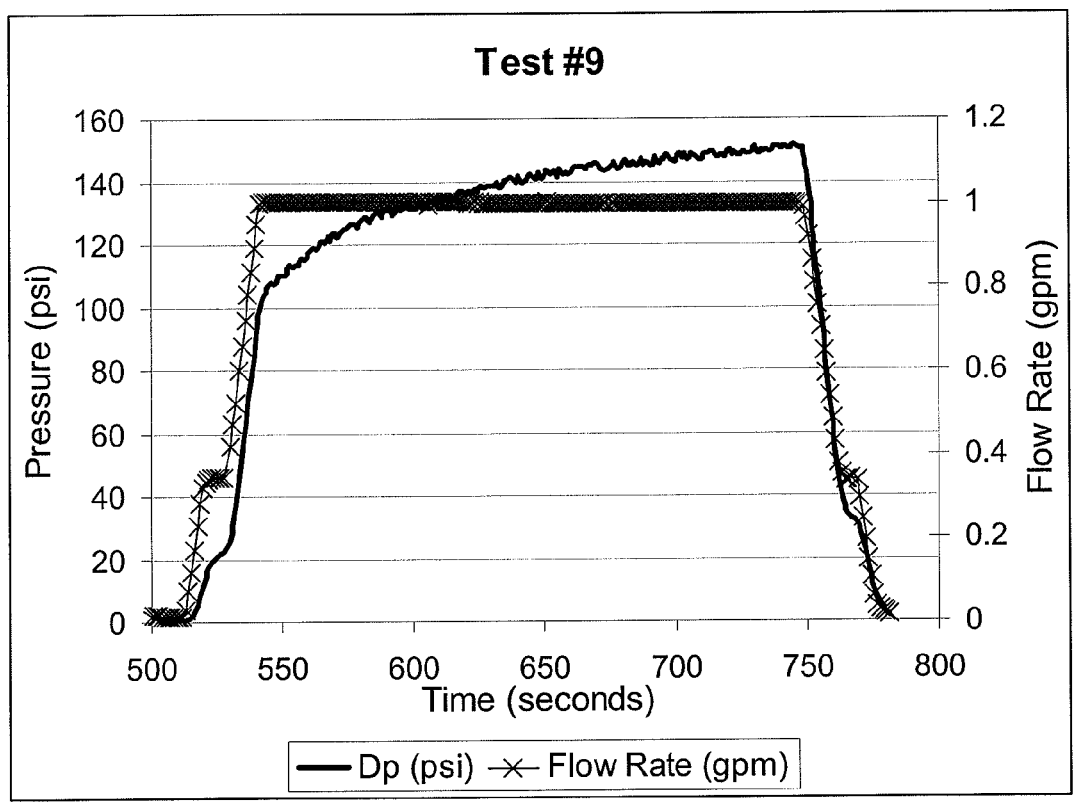
FIG. 9 shows the results of Test #9, sand coated with 0.2% tackifying agent and 3% degradable material.

Test #9: The cell was packed with 150 g of sand that was coated with 0.2% Sandwedge and with 3% polylactic acid. At 1 gal/min, a ramp in pressure of about 0.23 psi/sec was seen, as shown in FIG. 9.

Figure 10:
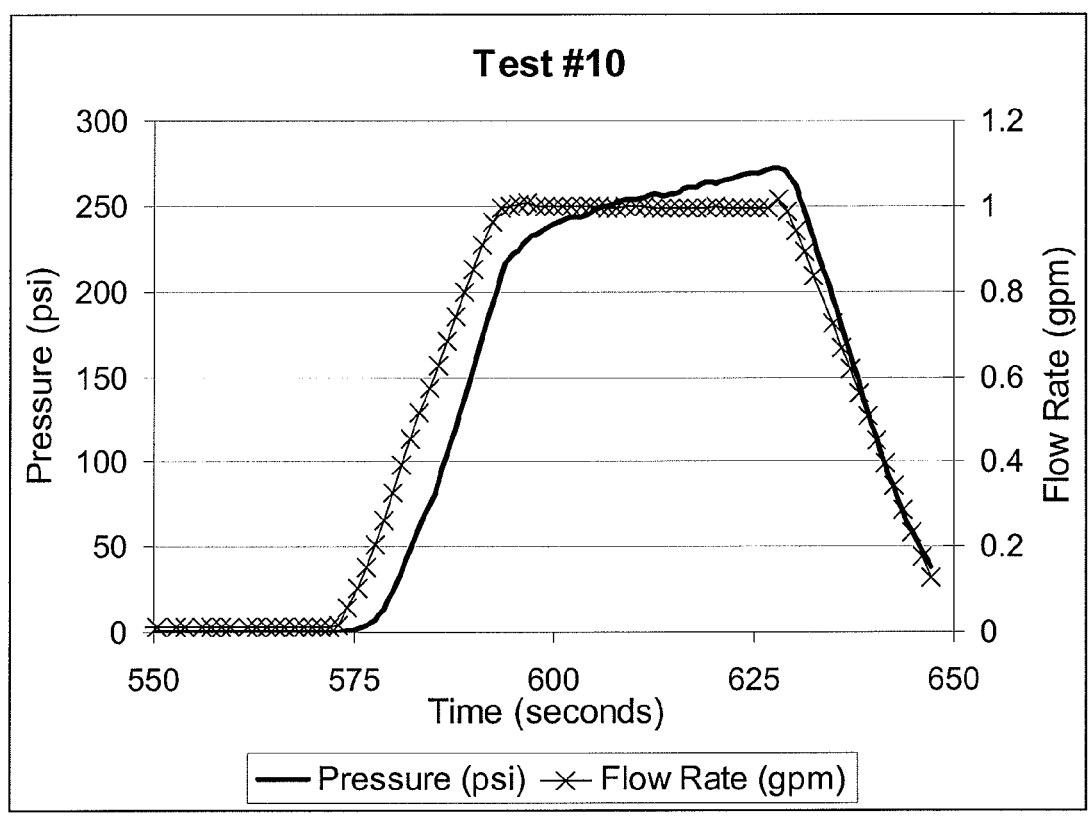
FIG. 10 shows the results of Test #10, sand coated with 1% tackifying agent and 8.3% degradable material.

Test #10: The cell was packed with 150 g of sand that was coated with 1% Sandwedge and with 8.3% polylactic acid (an amount found to mostly detackify the Sandwedge). As noted above, the pressure remained steady during the lower rate (40 mL/min or 0.01 gal/min) while, as seen in FIG. 10, at 1 gal/min, a ramp in pressure of about 1.55 psi/sec was seen.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b,") or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method of placing a self-diverting high-rate water pack comprising:
   providing a low-viscosity carrier fluid, gravel, a tackifying agent, and degradable fines wherein the gravel is at least partially coated with a tackifying agent and wherein degradable fines are adhered to the surface of the gravel having tackifying agent thereon;
   suspending the gravel into the low-viscosity carrier fluid;
   placing the suspended gravel in the carrier fluid into a subterranean formation such that the gravel forms a gravel pack having pore spaces within at least a portion of the subterranean formation; and,
   forming a gravel pack wherein the degradable fines have de-adhered from the surface of the gravel and filled at least a portion of the pore spaces between the gravel particulates.

2. The method of claim 1 wherein the low-viscosity carrier fluid have a viscosity of less than about 20 cp.

3. The method of claim 1 wherein the low-viscosity carrier fluid is placed into the subterranean formation at a rate less than the fracture rate of that subterranean formation.

4. The method of claim 1 wherein the low-viscosity carrier fluid is placed into the subterranean formation at a rate above the fracture rate of that subterranean formation.

5. The method of claim 1 wherein the low-viscosity carrier fluid is placed into the subterranean formation at a rate from about 10 barrels per minute to about 25 barrels per minute.

6. The method of claim 1 wherein the section of the subterranean formation is a deviated well over 100-feet in length.

7. The method of claim 1 wherein the tackifying agent comprises at least one substance selected from the group consisting of: a non-aqueous tackifying agent; an aqueous tackifying agent; a silyl-modified polyamide, and any derivative thereof.

8. The method of claim 1 wherein the degradable fines comprise at least one substance selected from the group consisting of: a degradable polymer, a dehydrated compound, and combinations thereof.

9. The method of claim 1 wherein the degradable fine comprises at least one degradable polymer selected from the group consisting of: a polysaccharide, a chitin; a chitosan; a protein; an aliphatic polyester; a poly(lactide); a poly(glycolide); a poly($\epsilon$-caprolactone); a poly(hydroxybutyrate); a poly(anhydride); an aliphatic polycarbonate; a poly(ortho ester); a poly(amino acid); a poly(ethylene oxide); and a polyphosphazene.

10. The method of claim 1 wherein the degradable fine comprises at least one dehydrated compound selected from the group consisting of: a particulate solid dehydrated salt and a particulate solid anhydrous borate material.

11. A method of reducing fluid loss during placement of a high-rate water pack comprising:
    providing a low-viscosity carrier fluid, gravel, a tackifying agent, and degradable fines wherein the gravel is at least partially coated with a tackifying agent and wherein degradable fines are adhered to the surface of the gravel having tackifying agent thereon;
    suspending the gravel into the low-viscosity carrier fluid;
    placing the suspended gravel in the carrier fluid into a subterranean formation such that the gravel forms a gravel pack having pore spaces within at least a portion of the subterranean formation; and,
    forming a gravel pack wherein the degradable fines have de-adhered from the surface of the gravel and filled at least a portion of the pore spaces between the gravel particulates.

12. The method of claim 11 wherein the low-viscosity carrier fluid have a viscosity of less than about 20 cp.

13. The method of claim 11 wherein the low-viscosity carrier fluid is placed into the subterranean formation at a rate less than the fracture rate of that subterranean formation.

14. The method of claim 11 wherein the low-viscosity carrier fluid is placed into the subterranean formation at a rate above the fracture rate of that subterranean formation.

15. The method of claim 11 wherein the low-viscosity carrier fluid is placed into the subterranean formation at a rate from about 10 barrels per minute to about 25 barrels per minute.

16. The method of claim 11 wherein the section of the subterranean formation is a deviated well over 100-feet in length.

17. The method of claim 11 wherein the tackifying agent comprises at least one substance selected from the group consisting of: a non-aqueous tackifying agent; an aqueous tackifying agent; a silyl-modified polyamide, and any derivative thereof.

18. The method of claim 11 wherein the degradable fines comprise at least one substance selected from the group consisting of: a degradable polymer, a dehydrated compound, and combinations thereof.

19. The method of claim 11 wherein the degradable fine comprises at least one degradable polymer selected from the group consisting of: a polysaccharide, a chitin; a chitosan; a protein; an aliphatic polyester; a poly(lactide); a poly(glycolide); a poly(c-caprolactone); a poly(hydroxybutyrate); a poly(anhydride); an aliphatic polycarbonate; a poly(ortho ester); a poly(amino acid); a poly(ethylene oxide); and a polyphosphazene.

20. The method of claim 11 wherein the degradable fine comprises at least one dehydrated compound selected from the group consisting of: a particulate solid dehydrated salt and a particulate solid anhydrous borate material.

* * * * *